US009195378B2

(12) United States Patent
Kumagai et al.

(10) Patent No.: US 9,195,378 B2
(45) Date of Patent: *Nov. 24, 2015

(54) METHOD, SYSTEM AND PROGRAM FOR SUPPORTING INPUT OF EXECUTION PARAMETER OF PREDETERMINED SOFTWARE TO INPUT FIELD

(71) Applicant: International Business Machines Corporation, Armonk, NY (US)

(72) Inventors: Ken Kumagai, Kanagawa (JP); Kotaro Shima, Kanagawa (JP)

(73) Assignee: International BusinessMachines Corporation, Armonk, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/941,509

(22) Filed: Jul. 14, 2013

(65) Prior Publication Data
US 2013/0305183 A1 Nov. 14, 2013

Related U.S. Application Data

(63) Continuation of application No. 12/895,820, filed on Sep. 30, 2010, now Pat. No. 8,522,156.

(30) Foreign Application Priority Data

Sep. 30, 2009 (JP) ................................. 2009-227925

(51) Int. Cl.
*G06F 3/048* (2013.01)
*G06F 3/0484* (2013.01)
*G06F 17/24* (2006.01)
*G06F 3/0482* (2013.01)
(Continued)

(52) U.S. Cl.
CPC ............ *G06F 3/0484* (2013.01); *G06F 3/0237* (2013.01); *G06F 3/0482* (2013.01); *G06F 17/243* (2013.01); *H04N 1/00408* (2013.01)

(58) Field of Classification Search
CPC ..... G06F 3/048; G06F 3/0484; G06F 3/0237; G06F 17/243; G06F 3/0482; H04N 1/00408
USPC ......................................................... 715/780
See application file for complete search history.

(56) References Cited

U.S. PATENT DOCUMENTS

2007/0100809 A1 5/2007 Dettinger et al.
2007/0174350 A1 7/2007 Pell et al.
(Continued)

FOREIGN PATENT DOCUMENTS

WO 0241185 A1 5/2002

OTHER PUBLICATIONS

Peter Carlson, "Apache Lucene—Query Parser Syntax", The Apache Software Foundation, http://lucene.apache.org/java/2_3_2/queryparsersyntax.pdf, last visited Sep. 24, 2010.
(Continued)

*Primary Examiner* — Angie Badawi
(74) *Attorney, Agent, or Firm* — Steven M. Greenberg, Esq.; CRGO LAW

(57) ABSTRACT

To provide a method, a program and a system for supporting the input of one or more execution parameters of predetermined software in an input field. The method includes: receiving input of a text character string including one or more execution parameters in the input field displayed on a display device; displaying one the display device one or more execution options of the predetermined software in such a manner that a user can select the options in response to selection of a part of the text character string by the user; and transforming the text character string so as to include at least one of the one or more execution options selected and displaying the transformed text character string on the display device. The one or more execution options displayed can vary with the type of selection of the part of the text character string.

15 Claims, 11 Drawing Sheets

(51) Int. Cl.
*G06F 3/023* (2006.01)
*H04N 1/00* (2006.01)

(56) References Cited

U.S. PATENT DOCUMENTS

2008/0228468 A1  9/2008  Deshpande et al.

2009/0055356 A1  2/2009  Hanyu

OTHER PUBLICATIONS

"Google Search Basics: More Search Help", Google Web Search, http://www.google.com/support/websearch/bin/answer.py?hl=en&answer=136861, last visited Sep. 24, 2010.

Figure 8

| | Syntax | Human-understandable expression |
|---|---|---|
| Phrases | "hello dolly" | a phrase "hello dolly" |
| Fields | title:"The Right Way" | Title field value contains "The Right Way" |
| WildCards | te?t | starts with "te", then any 1 character, and ends with "t" |
| | test* | starts with "test", and ends with any characters |
| Fuzzy Search | roam~ | similar to roam (e.g. foam, roams) |
| Proximity Search | "jakarta apache"~10 | contains "jakarta" and "apache" within 10 terms |
| Range Search (inclusive) | mod_date:[20020101 TO 20030101] | Mod_date field value is equal to or greater than 20020101 and is equal to or less than 20030101 |
| Range Search (exclusive) | title:{Aida TO Carmen} | Title field value is between Aida and Carmen |
| Boosting a term | jakarta^4 apache | "jakarta" or "apache" where" jakarata" is 4 times more relevant compared to "apache" |
| Boolean Operators | "jakarta apache" OR jakarta | contains either "jakarta apache" OR jakarta |
| | "jakarta apache" AND "Apache Lucene" | contains both "jakarta apache" AND "Apache Lucene" |
| | +jakarta lucene | must contain "jakarta" and may contain "lucene" |
| | "jakarta apache" NOT "Apache Lucene" | contain "jakarta apache" but not "Apache Lucene" |
| | "jakarta apache" - "Apache Lucene" | contain "jakarta apache" but not "Apache Lucene" |
| Grouping | (jakarta OR apache) AND website | (jakarta OR apache) AND website |
| Field Grouping | title:(+return +"pink panther") | title that contains both the word "return" and the phrase "pink panther" |

Figure 9

| Selection Type (910) | Menu IDs (920) |
|---|---|
| substring | 1, 2 |
| single term | 4, 5, 8, 9, 10 |
| multiple terms (2 terms) | 3, 4, 6, 7, 8, 9, 10, 11, 12, 13 |
| multiple terms (3+ terms) | 3, 4, 7, 8, 9, 10, 11, 12, 13 |

| Menu ID | Menu Label | Submenu IDs |
|---|---|---|
| 1 | Wild Card (one character) | Null |
| 2 | Wild Card (Multiple characters) | Null |
| 3 | Phrase | Null |
| 4 | Fields | 14, 15, 16 |
| 5 | Fuzzy Search | Null |
| 6 | Range Search | 17, 18 |
| 7 | Proximity | 20, 21, 23, 24, 25, 26, 27 |
| 8 | Boost | 19, 21, 22, 24 |
| 9 | Must contain | Null |
| 10 | Must NOT contain | Null |
| 11 | AND | Null |
| 12 | OR | Null |
| 13 | Field Grouping | 14, 15, 16 |
| 14 | Title | Null |
| 15 | Owner | Null |
| 16 | Description | Null |
| 17 | Inclusive | 14, 15, 16 |
| 18 | Exclusive | 14, 15, 16 |
| 19 | 0.5 | Null |
| 20 | 1 | Null |
| 21 | 2 | Null |
| 22 | 4 | Null |
| 23 | 5 | Null |
| 24 | 10 | Null |
| 25 | 20 | Null |
| 26 | 50 | Null |
| 27 | 100 | Null |

1000

METHOD, SYSTEM AND PROGRAM FOR SUPPORTING INPUT OF EXECUTION PARAMETER OF PREDETERMINED SOFTWARE TO INPUT FIELD

CROSS-REFERENCE TO RELATED APPLICATIONS

This application is a Continuation of U.S. application Ser. No. 12/895,820, filed on Sep. 30, 2010, now U.S. Pat. No. 8,522,156, entitled "METHOD, SYSTEM AND PROGRAM FOR SUPPORTING INPUT OF EXECUTION PARAMETER OF PREDETERMINED SOFTWARE TO INPUT FIELD," the entirety of which is incorporated herein by reference. U.S. application Ser. No. 12/895,820 claims priority under 35 U.S.C. §119(a) to Japanese Patent Application Serial Number 2009-227925, filed Sep. 30, 2009, entitled "METHOD, SYSTEM AND PROGRAM FOR SUPPORTING INPUT OF EXECUTION PARAMETER OF PREDETERMINED SOFTWARE TO INPUT FIELD", the entirety of which is incorporated herein by reference.

FIELD OF THE INVENTION

The present invention generally relates to a user interface. More specifically, the present invention relates to a method, a system and a program for supporting the input of an execution parameter of predetermined software to an input field.

BACKGROUND OF THE INVENTION

Recent proliferation of the Internet has made it common for users to access servers on the Internet or other networks from their own client systems and enjoy a wide variety of services provided thereby. For example, the services include the Internet search service. In the provision of the service, the user first inputs one or more execution parameters in the input form on the web page received from the server and transmits the information. The server executes a processing based on the received parameter(s) and provides the service to the user.

FIG. 7 shows an example of a browser window including an input form used for input of an execution parameter. A web page 720 shown in FIG. 7 provides an input interface of an Internet search service. A user who wants to use the Internet search service inputs, as an input parameter to the search engine, one or more search terms separated by a space in an input field 725 and transmits the search terms to the search server by pressing an execution button 730 labeled "Search". The search server executes a search processing using the received search terms and returns a web page containing the search result to the user.

Many companies in the industry have been developing various techniques associated with the above description. The following patent documents and non-patent documents are examples of those techniques.

International Publication No. WO2002041185.
U.S. Patent Application Publication No. 20070174350.
U.S. Patent Application Publication No. 20070100809.
U.S. Patent Application Publication No. 20080228468.

With the current techniques, an execution option in the text expression can be added to a parameter input in an input field. For example, for "Apache Lucene", which is an open source software search engine, a search option can be specified for an input parameter according to the syntax shown in FIG. 8 ("Apache Lucene—Query Parser Syntax", Peter Carlson, The Apache Software Foundation, http://lucene.apache.org/java/2_3_2/queryparsersyntax.pdf, last visited on Sep. 10, 2009).

However, the search option specification described above is inconvenient in that a user who wants to specify a search option has to memorize the specifications of the options or refer to the manual in order to input parameters. In addition, the syntax for specifying options may vary with individual tools ("Google search basics: More search help", http://www.google.com/support/websearch/bin/answer.py?hl=en&answer=136861, last visited on Sep. 10, 2009, for information on the syntax for the Google™ search engine, for example). Thus, a user of a plurality of types of tools may have to inconveniently memorize the respective syntaxes, for example.

Thus, an object of the present invention is to provide an improved method, system and program for supporting the input of an execution parameter of predetermined software to an input field.

SUMMARY OF THE INVENTION

In order to attain the object described above, a method for supporting input of one or more execution parameters of predetermined software in an input field is provided. The method comprises: receiving input of a text character string including one or more execution parameters in the input field displayed on a display device; displaying on the display device one or more execution options of the predetermined software in such a manner that a user can select the options in response to selection of a part of the text character string by the user; and transforming the text character string so as to include at least one of the one or more execution options selected and displaying the transformed text character string. The one or more execution options displayed can vary with the type of selection of the part of the text character string.

Preferably, the one or more parameters and execution options included in the transformed text character string are transmitted to a server that executes the predetermined software.

Preferably, the method further comprises determining the selection type corresponding to the range of the selected part of the text character string, and the display of the execution options includes identifying one or more execution options of the predetermined software corresponding to the selection type.

Preferably, in a case where the text character string includes a plurality of input parameters, the input parameters are separated by a delimiter, such as a space (a blank character), and the selection type is determined by considering the delimiter that is included in and/or adjacent to the selected part of the text character string.

Preferably, the method further comprises calculating the number of parameters associated with the selected part of the text character string based on the delimiter included in the selected part of the text character string. Preferably, the method further comprises determining the selection type based on whether the selected part of the text character string is adjacent to a delimiter or not.

Although the present invention has been outlined as a method, the present invention can also be understood as a system, a software product, software or a program. The software product may be a storage medium that stores the software described above or a medium for transmitting the software.

Note that the above outline of the present invention does not completely cover all the essential features of the present invention, and combinations or sub-combinations of the components are also included in the present invention.

BRIEF DESCRIPTION OF THE DRAWINGS

FIG. 8 shows an example of a syntax for parameter input according to the embodiment of the present invention;

FIG. 9 shows an example of a selection type table according to the embodiment of the present invention;

FIG. 10 shows an example of a menu table according to the embodiment of the present invention;

DETAILED DESCRIPTION OF THE DRAWINGS

Figure 1:
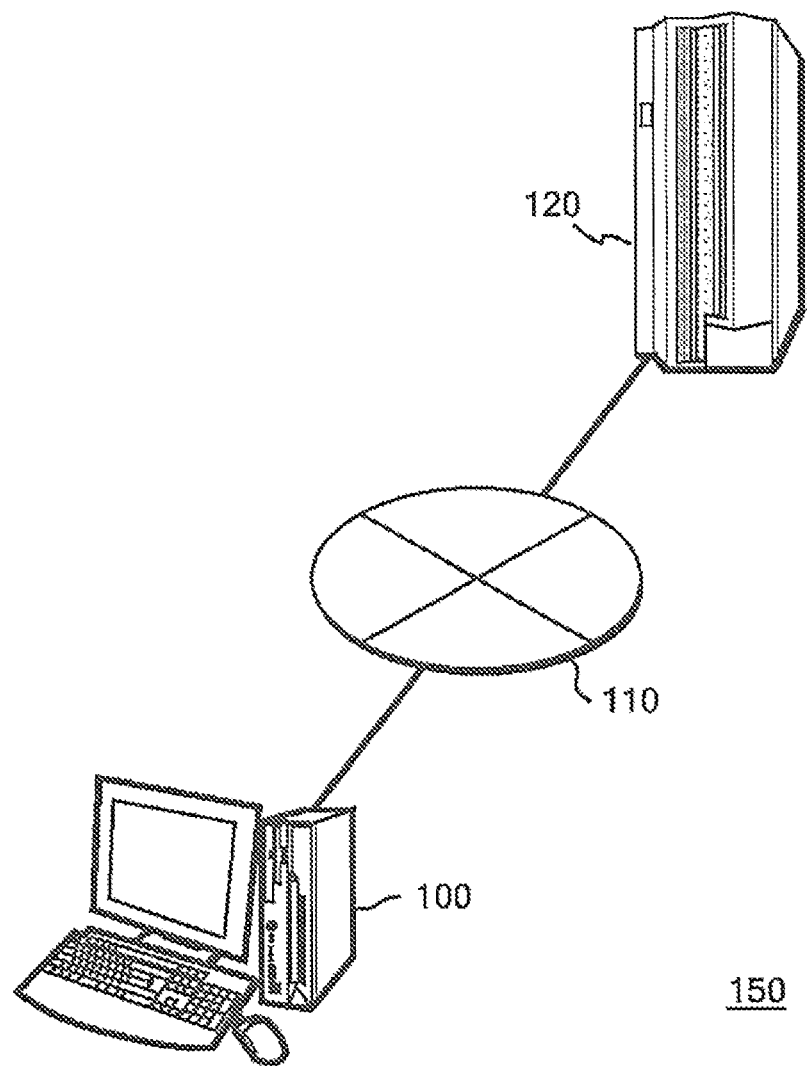
FIG. 1 is a diagram showing an exemplary data processing system according to an embodiment of the present invention.

In the following, a best mode for carrying out the present invention will be described in detail with reference to the drawings. However, note that the embodiment described below is not intended to limit the present invention, which is defined by the Claims, and not all combinations of features of the present invention described with regard to the embodiment are not essential for the means for solving the problems according to the present invention.

The present invention can be implemented in many different ways and should not be construed as being limited to the specific embodiment described below. In addition, note that not all the combinations of features of the present invention described with regard to the embodiment are not essential for the means for solving the problems according to the present invention. The same components are denoted by the same reference numerals throughout the description of the embodiment.

First, the embodiment of the present invention will be outlined. A data processing system 150 according to this embodiment of the present invention requires a user to input a search condition in the form of a text character string in an input field in an input form displayed on a browser of a client system 100. The text character string includes one or more search terms, which are execution parameters, and may include a search option according to a syntax shown in FIG. 8.

In this embodiment of the present invention, the input of a search condition begins with a user inputting a text character string including a search word in the input field and selecting a part of the text character string. Then, the client system 100 determines the type of selection of the text character string (whether the type of selection is "substring" (which means a partial character string in a term), "single term" (which means a single term), "multiple terms (2 terms)" (which means a plurality of terms, in particular, two terms) or "multiple terms (3+ terms)" (which means a plurality of terms, in particular, three or more terms) in this embodiment of the present invention).

Then, a menu of search options is presented to prompt the user to make a search option selection. In this embodiment of the present invention, the menu presented varies with the type of selection determined, so that the user can efficiently make a search option selection. Then, the text character string is transformed to additionally include the selected search option.

The search condition input in the form of the text character string as described above is transmitted to a web server 120 over a network 110, and the result of a search service processing is returned to the client system 100 in the form of a web page.

FIG. 1 shows an example of the data processing system 150 according to this embodiment of the present invention. The data processing system 150 according to this embodiment comprises the client system 100, the network 110 and the web server 120.

The client system 100 according to this embodiment of the present invention uses a web browser program to receive a search service from the web server 120. The web server 120 according to this embodiment of the present invention executes a service processing and returns the result of the processing to the client system 100 in response to a service request received from the client system 100 over the network 110.

In the data processing system 150 according to this embodiment of the present invention, the client system 100 and the web server 120 communicate with each other over the network 110. For example, the network 110 can be the Internet, which is well known, and the systems can be interconnected using TCP/IP, which is a communication protocol well known to those skilled in the art.

Figure 2:
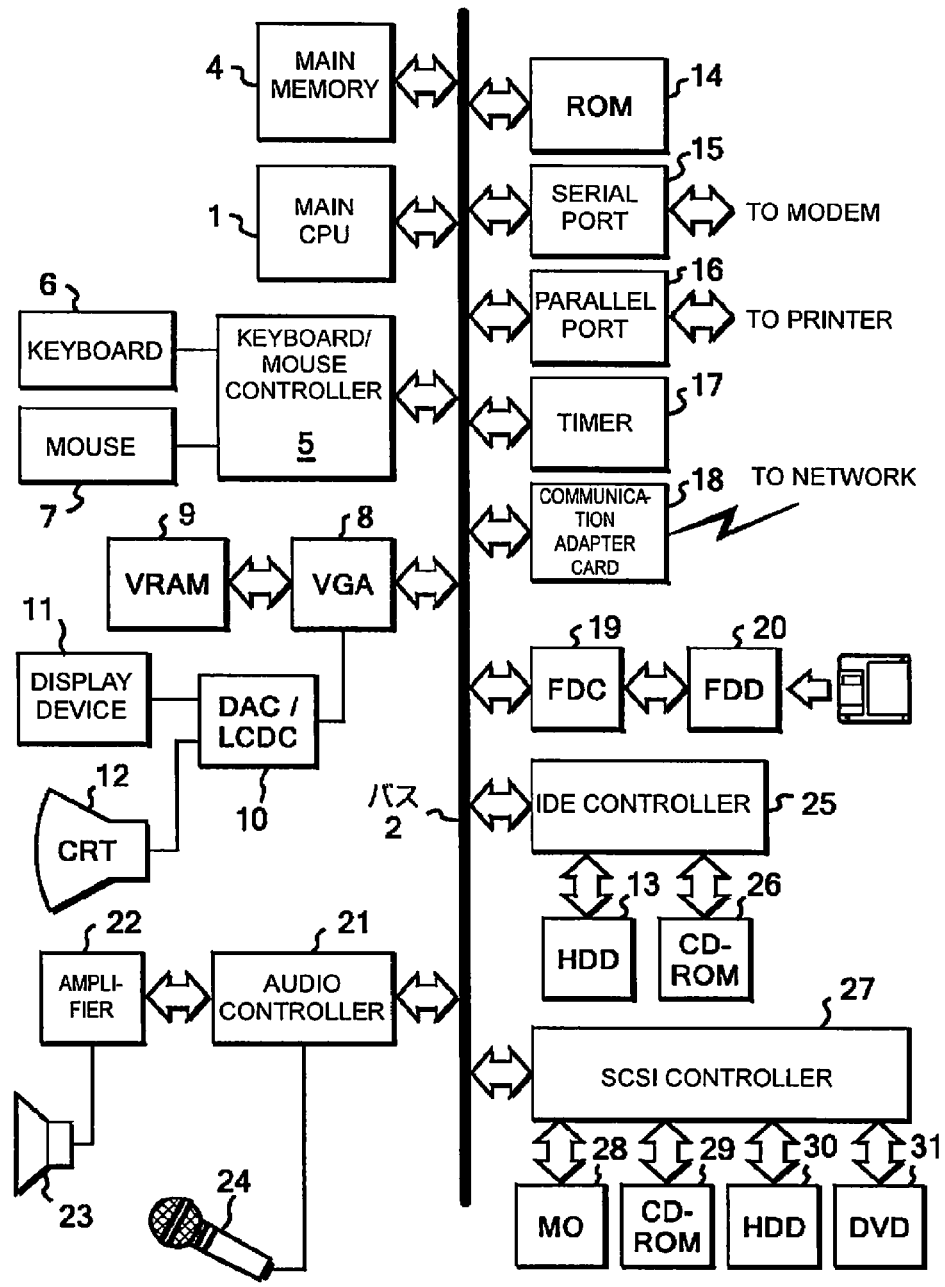
FIG. 2 is a diagram showing an exemplary hardware configuration of an information processing apparatus suitable for implementing a client system according to the embodiment of the present invention.

FIG. 2 is a diagram showing an exemplary hardware configuration of an information processing apparatus suitable for implementing the client system 100 according to this embodiment of the present invention. The information processing apparatus has a central processing unit (CPU) 1 and a main memory 4, which are connected to a bus 2. Removable storages (external storage systems with a replaceable recording medium) including hard disk drives 13 and 30, CD-ROM drives 26 and 29, a flexible disk drive 20, an MO drive 28 and a DVD drive 31 are connected to the bus 2 via a floppy disk controller 19, an IDE controller 25, an SCSI controller 27 or the like.

Storage media, such as a flexible disk, an MO, a CD-ROM and a DVD-ROM, are inserted into the removable storages. The storage media, the hard disk drives 13 and 30 and a ROM 14 can store a code of a computer program that cooperates with an operating system to issue a command to the CPU or the like to implement the present invention. The computer program is loaded to the main memory 4 before execution.

The computer program may be compressed or divided into a plurality of sections and recorded in a plurality of media.

The information processing apparatus receives an input from an input device, such as a keyboard 6 and a mouse 7, through a keyboard/mouse controller 5. The information processing apparatus is connected to a display apparatus 11 that presents visual data to the user via a DAC/LCDC 10.

The information processing apparatus can connect to the network via a network adapter 18 (an Ethernet® card or token ring card) or the like to communicate with another computer or the like. Although not shown, the information processing apparatus can be connected to a printer via a parallel port or to a modem via a serial port, for example.

As can be readily understood from the above description, the information processing apparatus suitable for implementing the client system 100 according to this embodiment of the present invention can be an ordinary personal computer, an ordinary workstation, an ordinary mainframe, or a combination thereof. However, the components described above are only illustrative, and all the components are not always essential in the present invention.

Of course, those skilled in the art can readily devise various modifications, such as combining a plurality of machines and distributing the functionality among the machines to implement the hardware components of the information processing apparatus used in this embodiment of the present invention. Of course, these modifications are included in the spirit of the present invention.

The client system according to this embodiment of the present invention can be implemented on an operating system that supports a graphical user interface (GUI) multi-window environment, such as the Windows® operating system provided by Microsoft Corporation, the MacOS® operating system provided by Apple Computer Incorporated, and UNIX®-based systems with the X Window System (for example, AIX® provided by International Business Machines Corporation).

As can be understood from the above description, the application of the client system used in this embodiment of the present invention is not limited to a particular multi-window operating system environment.

Figure 3:
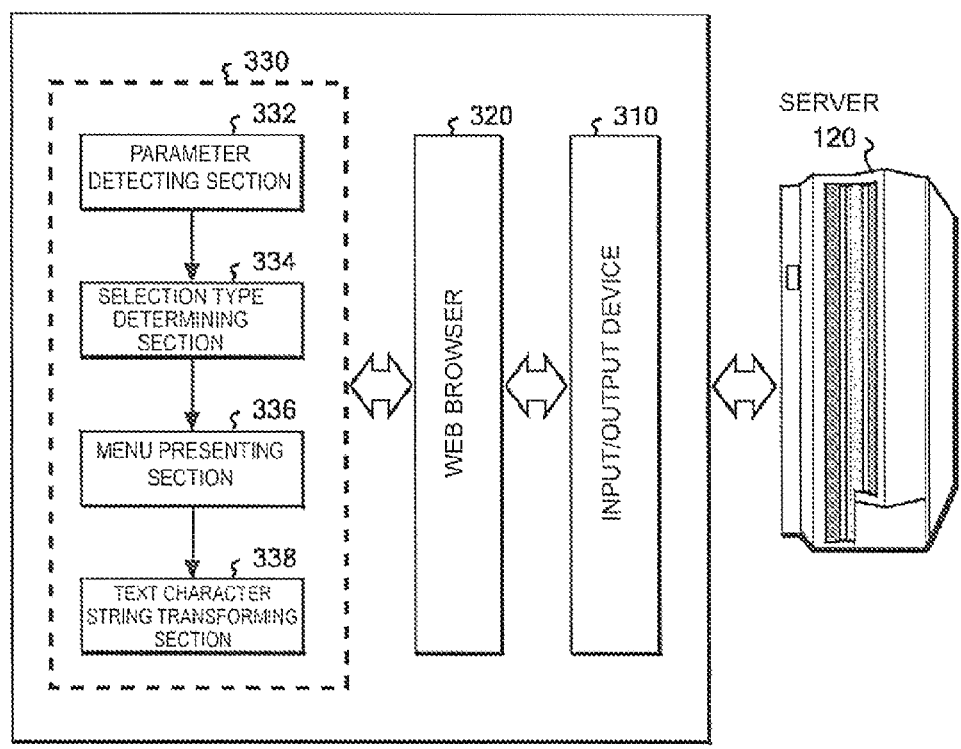
FIG. 3 is a functional block diagram showing the client system according to the embodiment of the present invention.

FIG. 3 is a functional block diagram showing the client system 100 according to this embodiment of the present invention. In the information processing apparatus having the hardware configuration shown in FIG. 2, the components shown in the functional block diagram of FIG. 3 can be implemented by loading the computer program, such as the operating system and application software, stored in the hard disk drive 13 or the like into the main memory 4 and then into the CPU 1 to make the hardware resources and the software cooperate with each other.

The client system 100 according to this embodiment of the present invention comprises an input/output device 310, a web browser 320, and a parameter input support program 330. In this embodiment of the present invention, it is supposed that the web browser 320 is implemented by a web browser program previously installed in the client system 100. It is also supposed that the input support program 330 is implemented by a JavaScript program downloaded to the client system 100 along with a web page including a parameter input field.

The input/output device 310 has a capability of displaying a browser window on a desktop screen of the operating system to present the browser window to the user. The input/output device 310 further has a capability of receiving a terminal manipulation by the user or a parameter input into the input form by the user. The input/output device 310 further has a capability of transmitting data to and receiving data from the web server 120 over the network 110.

The web browser 320 according to this embodiment of the present invention provides a capability of accessing the web server 120 or the like over the network 110, obtaining the parameter input form or a web page containing the search result, and presenting them to the user. The browser can be Internet Explorer (trademark) provided by Microsoft Corporation or Firefox (trademark) provided by Mozilla Corporation, for example.

The input support program 330 according to this embodiment of the present invention supports the user to input a parameter into the parameter input form received by the web browser 320. The input support program 330 according to this embodiment of the present invention comprises a parameter detecting section 332, a selection type determining section 334, a menu presenting section 336 and a text character string transforming section 338.

The parameter detecting section 332 according to this embodiment of the present invention detects one or more search terms, which are parameters input in the input form on the web page. In this embodiment of the present invention, when a plurality of search terms is input, the search terms are separated by spaces, which serve as delimiters. The parameter detecting section 332 can detect the part selected by the user in the input text character string including the search terms.

The selection type determining section 334 according to this embodiment of the present invention determines the selection type based on the part of the text character string including the search terms selected by the user. In this embodiment of the present invention, the selection type is "substring", "single term", "multiple terms (2 terms)", "multiple terms (3+ terms)" or "N/A" (unknown). The determination process will be described in detail later with reference to a flowchart 500 of FIG. 5.

The menu presenting section 336 according to this embodiment of the present invention provides a capability of presenting an execution option of an execution parameter of the search service provided by the web server 120 in the form of a menu depending on the selection type determined by the selection type determining section 334. Note that, in this embodiment of the present invention, the menu presented varies with the selection type. The user of the client system 100 selects a desired execution option from the menu, and the text character string transforming section 338 is informed of the selected execution option. The menu presentation process will be described in detail later with reference to a flowchart 600 of FIG. 6.

The text character string transforming section 338 according to this embodiment of the present invention transforms the text character string including one or more search terms input in an input field 725 to add the selected execution option informed by the menu presenting section 336 to the text character string. The text character string transformation process will be described in detail later with reference to examples shown in FIGS. 11 to 13.

Figure 4:
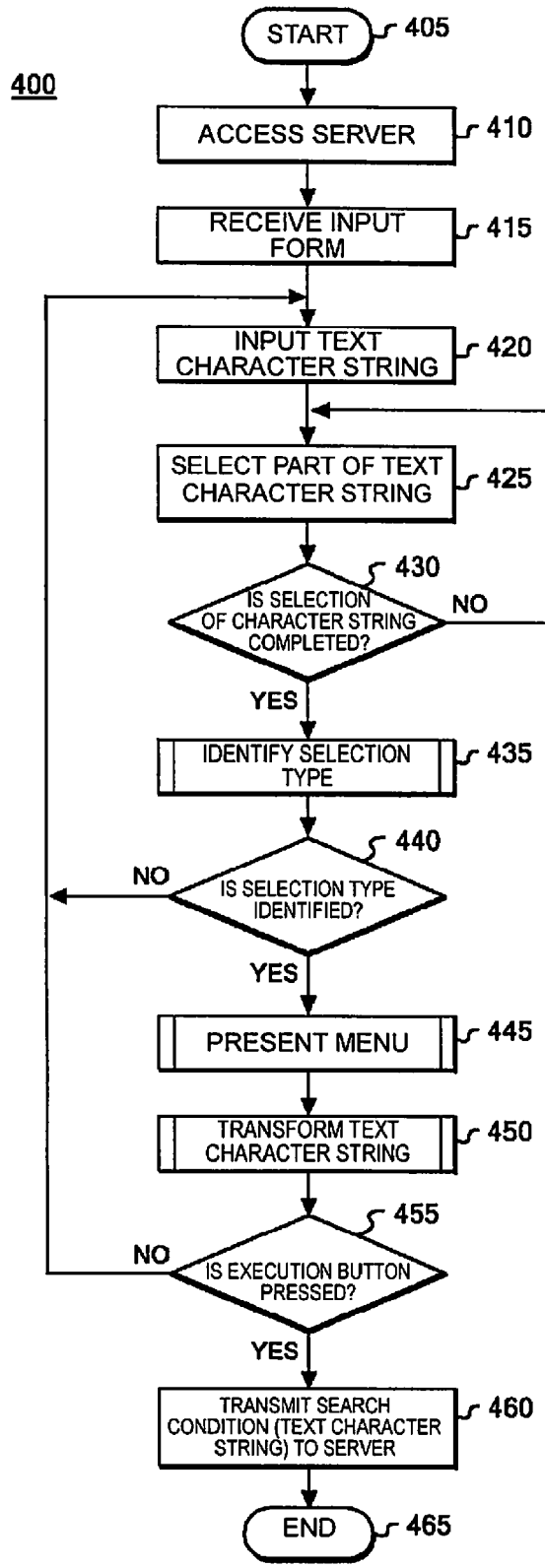
FIG. 4 is a flowchart showing the whole of an operation of the data processing system according to the embodiment of the present invention.

FIG. 4 is a flowchart 400 showing the whole of the operation of the data processing system according to this embodiment of the present invention. The process starts in step 405. In step 410, the client system 100 accesses the web server 120 that provides the search service over the network 110. The access is achieved by specifying the uniform resource locator (URL) corresponding to the web server 120 on the web browser 320.

Then, in step 415, the client system 100 receives the web page containing the input form transmitted from the server in response to the access in step 410.

Figure 7:
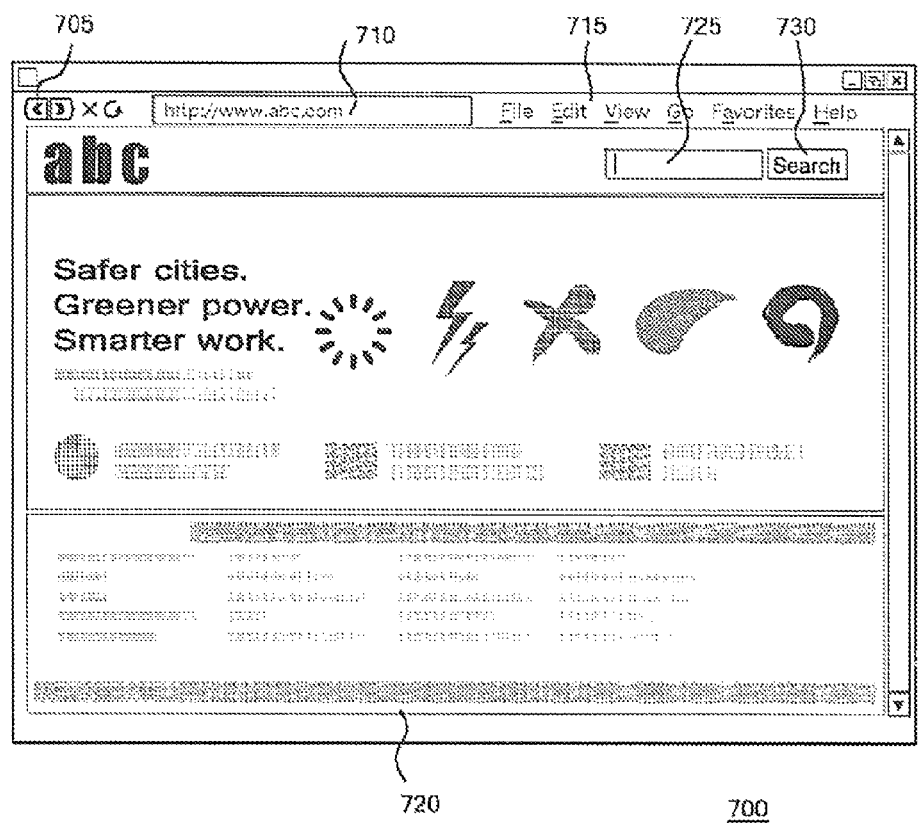
FIG. 7 shows an example of a browser window of the data processing system according to the embodiment of the present invention.

FIG. 7 shows an exemplary browser window of the data processing system according to this embodiment of the present invention. Note that a browser window 700 is displayed when the web page is received in step 415. The browser window 700 contains a tool bar 705, an address (URL) input area 710, a menu bar 715 and a page display area 720.

The tool bar 705 provides various functions, such as file manipulation and display control, in the form of button icons. The address (URL) input area 710 is used for the user of the client system 100 to specify the URL of the web server to be accessed. The menu bar 715 provides various functions, such as file manipulation and display control, to the user in the form of a menu. Access to the web server, jump between web sites, and other various settings or manipulations are achieved using the tool bar 705, the address (URL) input area 710 and the menu bar 715. However, these are well-known, and thus further detailed descriptions thereof will be omitted herein.

The page display area 720 is to display the web page received by the client system 100 from the web server 120 or the like. In the example of the web page shown in FIG. 7, the web page displayed contains the input field 725 used for the user to input a text character string serving as a search condition to use the Internet search service, and a search execution button 730 labeled "Search", in addition to an ordinary content. The client system 100 according to this embodiment of the present invention also has a function of supporting the user to input the search term in the input field 725. This function will be described in detail later.

Referring back to the flow chart 400 of FIG. 4, the process proceeds to step 420. In step 420, the user inputs one or more parameters, that is, search terms in the input field 725. Then, in step 425, the user selects a part of the text character string. The selection of a part of the text character string is performed using the mouse, the keyboard or the like, and the selected part is typically displayed with a different background color (see FIGS. 11 to 13).

The process proceeds to step 430, in which it is determined whether the selection of a part of the text character string is completed or not. The determination is made based on whether a predetermined time has elapsed since a part of the text character string is selected or whether a predetermined action, such as right click on the mouse, is performed, for example. However, the criterion of the determination is not limited to those described above. If it is determined in step 430 that the selection is not completed, the process returns to step 425 as shown by the arrow NO, and the selection of a part of the text character string continues.

If it is determined in step 430 that the selection is completed, the process proceeds to step 435 as shown by the arrow YES, and the selection type is determined. In this embodiment of the present invention, the selection type is "substring", "single term", "multiple terms (2 terms)", "multiple terms (3+ terms)" or "N/A". The determination process will be described in detail later with reference to the flowchart 500 of FIG. 5.

Then, it is determined in step 440 whether the selection type is identified or not. If it is determined in step 440 that the selection type is not identified, that is, it is determined that the selection type is "N/A", the process returns to step 420 as shown by the arrow NO, and a text character string is input again.

If it is determined in step 440 that the selection type is identified, that is, the selection type is determined to be any of "substring", "single term", "multiple terms (2 terms)" and "multiple terms (3+ terms)", the process proceeds to step 445 as shown by the arrow YES.

In step 445, depending on the selection type identified in step 435, execution options of execution parameters of the service provided by the web server 120 are presented in the form of a menu. In addition, in step 445, the user of the client system 100 selects a desired execution option from the set of execution options in the menu presented to the user. The menu presentation in step 440 will be described in detail later with reference to the flowchart 600 of FIG. 6.

Then, the process proceeds to step 450, in which the text character string is transformed to make the execution option selected in step 445 effective. The detailed specification of the transformation of the text character string will be described in detail later with reference to the examples shown in FIGS. 11 to 13.

Then, the process proceeds to step 455, in which it is determined whether the execution button 730 is pressed or not. If it is determined in step 455 that the execution button 730 is not pressed, the process returns to step 420 as shown by the arrow NO, and the input of the text character string continues. If it is determined in step 455 that the execution button 730 is pressed, and the input of the text character string representing the desired search condition is completed, the process proceeds to step 460 as shown by the arrow YES, in which the input text character string including the search terms and the search options is transmitted to the web server 120, and then, the process ends in step 465.

Figure 5:
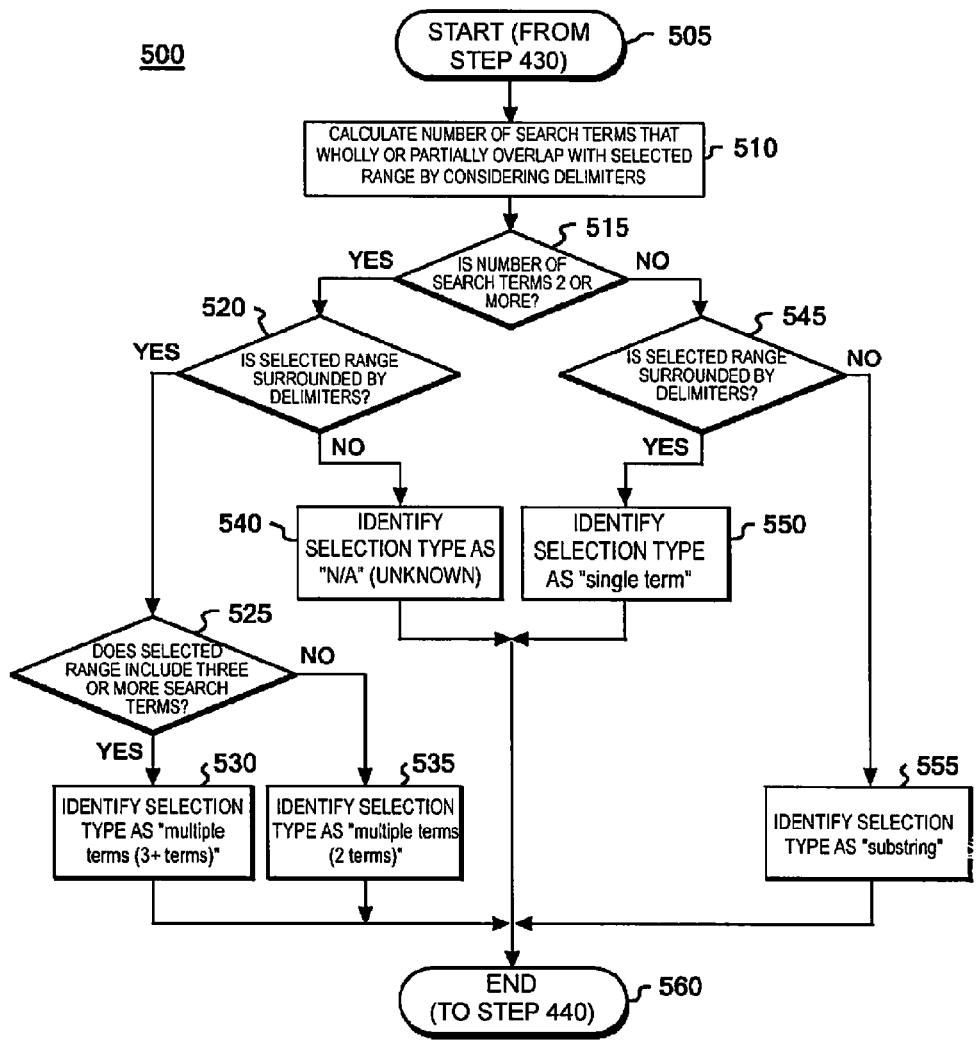
FIG. 5 is a flowchart showing an operation (selection type determination) of the data processing system according to the embodiment of the present invention.

Next, with reference to the flowchart 500 of FIG. 5, the determination of the selection type in step 435 in FIG. 4 will be described in detail. The process starts in step 505. In step 510, the number of search terms that wholly or partially overlap with the selected range of the text character string is calculated by considering the delimiters (blank characters (spaces) in this embodiment of the present invention). Then, in step 515, it is determined whether the number of search terms calculated in step 510 is multiple (two or more) or not.

If it is determined in step 515 that the number of search terms is multiple (two or more), the process proceeds to step 520 as shown by the arrow YES, and it is determined whether the selected range is surrounded by delimiters or not. If it is determined in step 520 that the selected range is surrounded by delimiters, the process proceeds to step 525 as shown by the arrow YES, and it is determined whether or not the selected range includes three or more terms.

If it is determined in step 525 that the selected range includes three or more terms, the process proceeds to step 530 as shown by the arrow YES, the selection type is identified as "multiple terms (3+ terms)", and then, the process proceeds to step 560 and ends (in other words, proceeds to step 440). If it is determined in step 525 that the selected range does not include three or more terms, the process proceeds to step 535 as shown by the arrow NO, the selection type is identified as "multiple terms (2 terms)", and then, the process proceeds to step 560 and ends.

If it is determined in step 520 that the selected range is not surrounded by delimiters, the process proceeds to step 540 as shown by the arrow NO, the selection type is identified as "N/A", and then, the process proceeds to step 560 and ends.

If it is determined in step 515 that the number of search terms is not multiple (two or more), the process proceeds to step 545 as shown by the arrow NO, and it is determined whether the selection range is surrounded by delimiters or not. If it is determined in step 545 that the selected range is surrounded by delimiters, the process proceeds to step 550 as shown by the arrow YES, the selection type is identified as "single term", and then, the process proceeds to step 560 and ends.

If it is determined in step 545 that the selected range is not surrounded by delimiters, the process proceeds to step 555 as shown by the arrow NO, the selection type is identified as "substring", and then, the process proceeds to step 560 and ends.

Next, with reference to the flowchart 600 of FIG. 6, the selection menu presentation in step 445 in FIG. 4 will be described in detail. The process starts in step 605. In step 610, a menu ID corresponding to the selection type identified in step 435 is obtained from a selection type table 900 contained in the menu presenting section 336. FIG. 9 shows an example of the selection type table 900 according to this embodiment of the present invention. The selection type table 900 contains selection types 910 and menu IDs 920 associated with each other.

Figure 6:
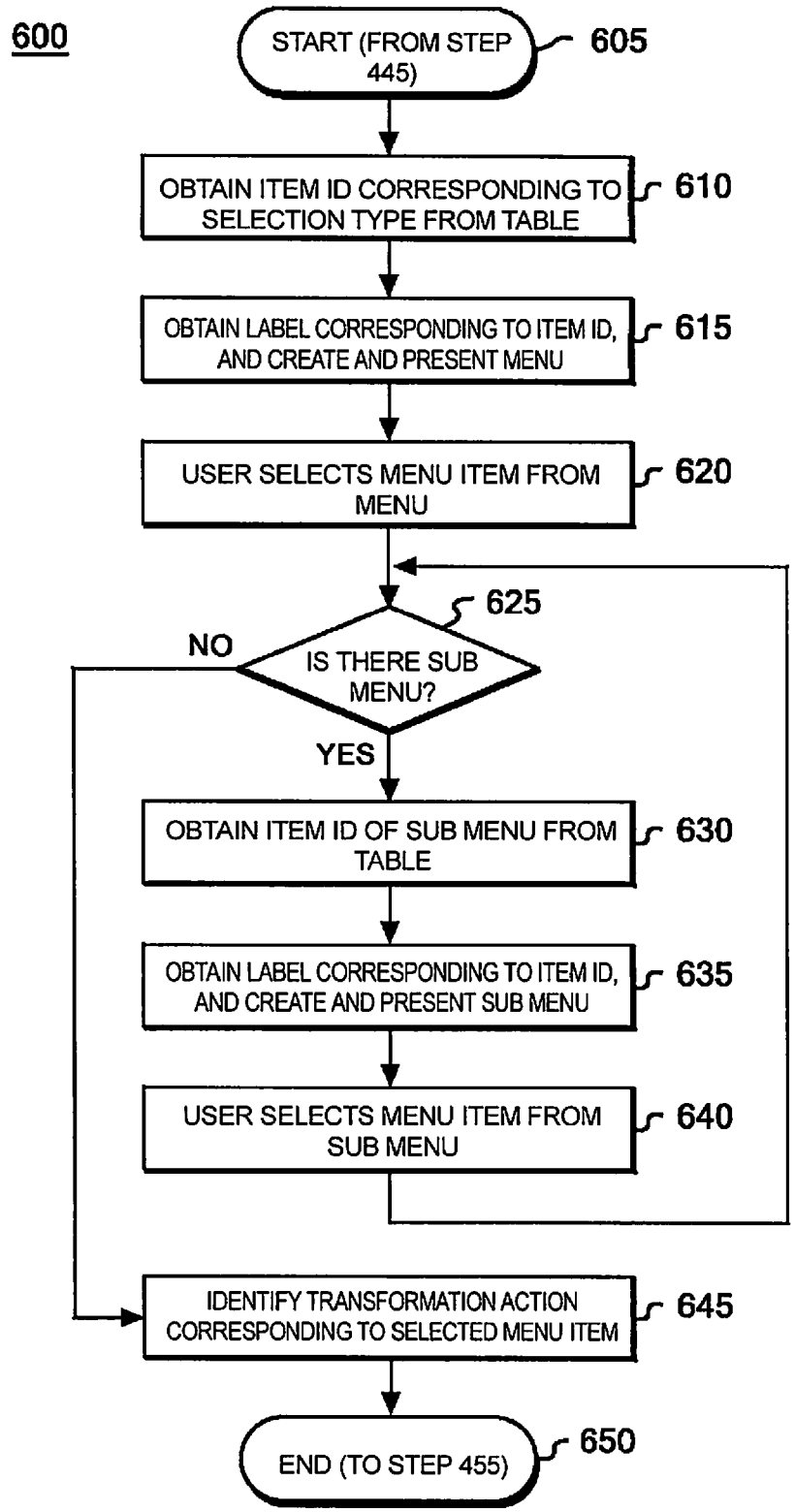
FIG. 6 is a flowchart showing an operation (menu presentation) of the data processing system according to the embodiment of the present invention.

Referring back to the flowchart 600 of FIG. 6, in step 610 according to this embodiment of the present invention, the menu presenting section 336 obtains a menu item ID from the selection type table 900 depending on the selection type. In this embodiment of the present invention, menu item IDs "1" and "2" are obtained if the selection type is "substring", and menu item IDs "4", "5", "8", "9" and "10" are obtained if the selection type is "single term". Menu item IDs "3", "4", "6", "7", "8", "9", "10", "11", "12" and "13" are obtained if the selection type is "multiple terms (2 terms)", and menu item IDs "3", "4", "7", "8", "9", "10", "11", "12" and "13" are obtained if the selection type is "multiple terms (3+ terms)".

Then, the process proceeds to step 615, in which a label corresponding to the menu ID obtained in step 610 is obtained from a menu table 1000 to create a selection menu, and the selection menu is presented to the user. FIG. 10 shows an example of the menu table 1000 according to this embodiment of the present invention. The menu table 1000 contains menu IDs 1010, menu labels 1020 and sub menu IDs 1030 associated with each other.

Then, the process proceeds to step 620, in which the user selects from among the menu items in the menu created and presented in step 615. Then, the process proceeds to step 625, in which it is determined whether the menu item selected in step 620 has a sub menu or not. In step 625, if the menu ID selected in the menu table 1000 has an associated sub menu ID, it is determined that the menu item corresponding to the menu ID has a sub menu.

If it is determined in step 625 that the menu item selected in step 620 has no sub menu, the process proceeds to step 645 as shown by the arrow NO, and the specification of the transformation of the text character string corresponding to the selected menu ID is identified. The identification is achieved by searching a table of contents shown in FIG. 8.

If it is determined in step 625 that the menu item selected in step 620 has a sub menu, the process proceeds to step 630 as shown by the arrow YES, and the sub menu ID is obtained from the menu table 1000. Then, the process proceeds to step 635, in which the label corresponding to the sub menu ID obtained in step 630 is obtained from the menu table 1000 to create a selection menu, and the selection menu is presented to the user. Then, the process proceeds to step 640, in which the user selects from among menu items in the sub menu created and presented in step 635.

Then, the process returns to step 625, and the process from step 625 to step 640 is repeated until it is determined in step 625 that the menu item selected in step 620 has no sub menu. Then, in step 645, the specification of the transformation of the text character string corresponding to the selected menu ID selected from the menu table 1000 is identified, and then, the process proceeds to step 650 and ends (in other words, proceeds to step 455).

Figure 11:
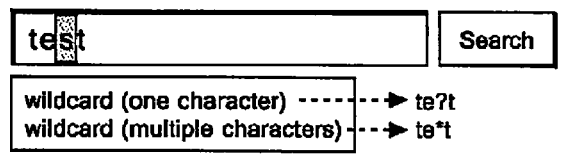
FIG. 11 shows an example of a graphical user interface of the data processing system according to the embodiment of the present invention (in the case where the selection type is identified as "substring")

FIG. 11 shows an example of a graphical user interface of the data processing system according to this embodiment of the present invention (in the case where the selection type is identified as "substring"). Specifically, FIG. 11 shows a menu that is displayed when a part of a search term "test", specifically one character "s" in the term, is selected. Note that, in this drawing, the search term is converted into a character string pointed by a dotted line arrow when the menu item shown at the root of the dotted line arrow is selected.

Figure 12:
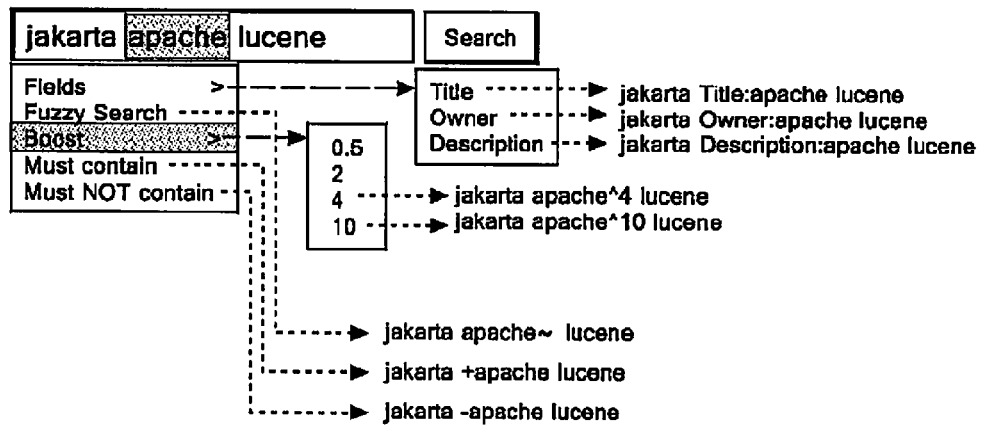
FIG. 12 shows an example of a graphical user interface of the data processing system according to the embodiment of the present invention (in the case where the selection type is identified as "single term")

FIG. 12 shows an example of a graphical user interface of the data processing system according to this embodiment of the present invention (in the case where the selection type is identified as "single term"). Specifically, FIG. 12 shows a case where only one search term "apache" of three search terms "jakarta apache lucene" is selected.

Figure 13:
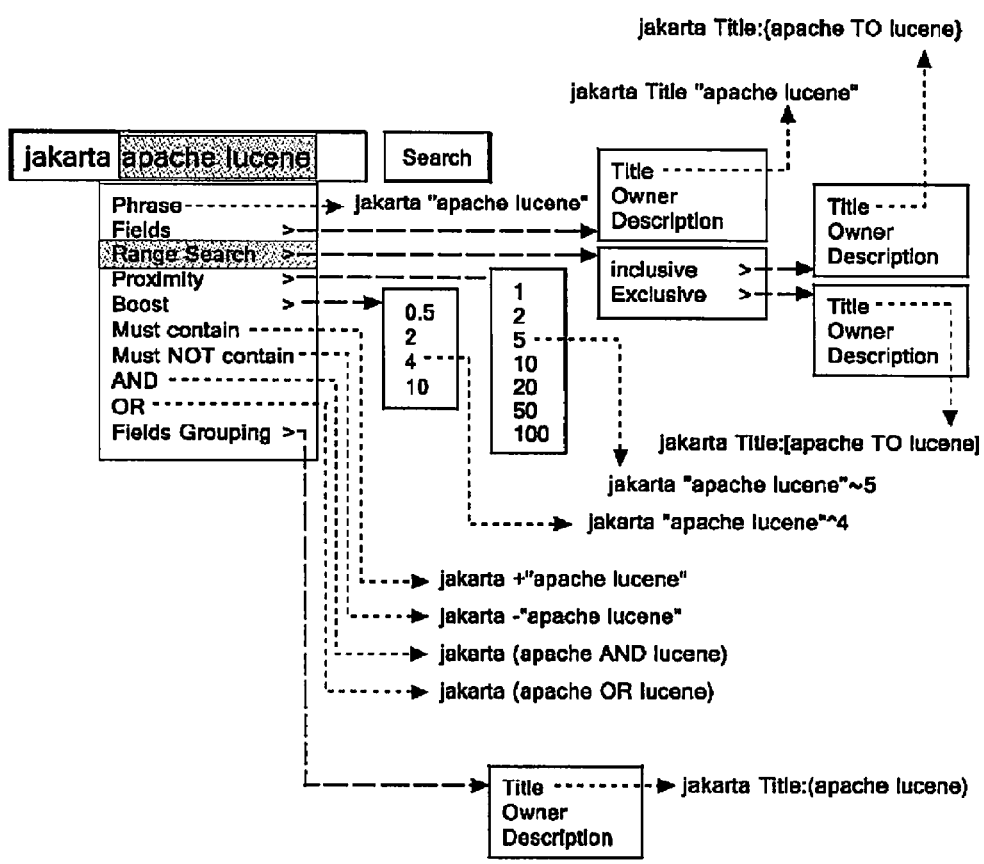
FIG. 13 shows an example of a graphical user interface of the data processing system according to the embodiment of the present invention (in the case where the selection type is identified as "multiple terms (2 terms)").

FIG. 13 shows an example of a graphical user interface of the data processing system according to this embodiment of the present invention (in the case where the selection type is identified as "multiple terms (2 terms)"). Specifically, FIG. 13 shows a case where two search terms "apache" and "lucene" of three search terms "jakarta apache lucene" are selected.

In FIGS. 12 and 13, the search term is converted into a character string pointed by a dotted line arrow when the menu item shown at the root of the dotted line arrow is selected. In addition, note that, if another menu is shown at the head of the arrow in the drawings, the sub menu is displayed. In this embodiment of the present invention, in the case where the selection type is identified as "multiple terms (3+ terms)", the transition diagram is the diagram of FIG. 13 from which parts involved with "Range Search" are removed.

As described above, according to this embodiment of the present invention, a method, a system and a program for supporting the input of a search term as a parameter in an input field are provided. Thus, as is apparent, the user operability in inputting a parameter in an input field on a computer is improved.

The present invention can be implemented by hardware, software or a combination of hardware and software. A typical example of the combination of hardware and software is a data processing system incorporating a predetermined program. In this case, once the predetermined program is loaded to and executed on the data processing system, the program controls the data processing system to execute the processing according to the present invention. The program is composed of a set of instructions that can be represented in any language, code or expression. The set of instructions can directly make the system perform a particular function or can make the system perform a particular function after either or both of (1) conversion to another language, code or expression and (2) copy into another medium is performed.

Of course, the present invention includes not only the program itself but also a medium in which the program is recorded. The program for executing the functionality of the present invention can be stored in any computer-readable recording medium, such as a flexible disk, an MO, a CD-ROM, a DVD, a hard disk drive, a ROM, an MRAM and a RAM. The program can be stored in the recording medium by downloading from another data processing system connected by a telecommunication line or copying from another recording medium. Furthermore, the program can be compressed or divided into a plurality of sections and stored in a single recording medium or a plurality of recording media. Note that a program product that implements the present invention can be provided in various forms, of course.

It will be apparent to those skilled in the art that the embodiment described above can be modified or altered in various ways. For example, although the input field is implemented as a simple text field in the embodiment of the present invention described above, the input field may be implemented as a rich text field, and the text character string may be transformed to indicate that a selected execution option is included according to the format of the "human-understandable expression" shown in FIG. 8. In this case, the execution parameter with the execution option according to the format of "Syntax" in FIG. 8 is internally hidden but held in the rich text field and transmitted to the web server in response to pressing of the execution button.

Furthermore, although the embodiment has been described with reference to the search engine complying with the syntax shown in FIG. 8 as an example, the present invention can be equally applied to any other search engine that uses a syntax other than that shown in FIG. 8. In addition, the present invention can be applied to any software other than the search engine that requires an execution parameter. In addition, although the embodiment of the present invention has been described on the assumption that the client system 100 transmits an execution parameter to the web server 120 over the network 110, the present invention can be applied to a case where an execution parameter is provided to a program executed in a single, or stand-alone, computer. The technical scope of the present invention includes embodiments modified or altered in these ways, of course.

The invention claimed is:

1. A method for supporting input of one or more execution parameters of predetermined software in an input field, comprising:
   receiving input of a text character string including one or more execution parameters in the input field displayed on a display device;
   determining a selection type in response to a user selection of a part of the text character string;
   displaying on the display device one or more execution options of the execution parameters depending on the determined selection type, where a user can select one of the one or more execution options in response to a selection of a part of said text character string by the user, said one or more execution options displayed varying according to the type of selection of the part of said text character string; and
   in response to the user selection of a desired execution option, transforming said text character string to include the desired execution option selected and displaying the transformed text character string on the display device,
   wherein said predetermined software is a search engine, said text character string represents a search condition, and said execution options are search options for said search engine and
   wherein said search options include search field specification, wild card, fuzzy search, proximity search, range search, search term boosting, Boolean operator, grouping and field grouping.

2. The method according to claim 1, further comprising:
   determining the selection type corresponding to the range of the selected part of said text character string,
   wherein said display of said execution options include identifying a set of execution options of said predetermined software corresponding to said selection type.

3. The method according to claim 1, further comprising:
   transmitting the one or more parameters and execution options included in said transformed text character string to a server that executes said predetermined software.

4. The method according to claim 1, wherein, in a case where said text character string includes a plurality of input parameters, the input parameters are separated by a delimiter.

5. The method according to claim 4, wherein said delimiter is a space or a blank character.

6. The method according to claim 2, wherein said selection type is determined by considering any delimiter that is included in or adjacent to said selected part of said text character string.

7. The method according to claim 5, further comprising:
   calculating the number of parameters associated with said selected part of said text character string based on the delimiter included in said selected part of said text character string.

8. The method according to claim 3, further comprising:
   determining said selection type based on whether said selected part of said text character string is adjacent to a delimiter or not.

9. The method according to claim 1, further comprising:
   obtaining an item ID corresponding to said selection type from an option item table; and
   presenting the execution option corresponding to the obtained item ID on an interface.

10. The method according to claim 1, further comprising:
    obtaining an item ID of a sub item from a table in a case where the item selected on said interface includes the sub item; and
    presenting an item corresponding to the obtained item ID of said sub item.

11. The method according to claim 1, wherein the execution options that can be selected are displayed on the display device in the form of a menu.

12. The method according to claim 1, wherein labels of said one or more execution options that can be selected are displayed on the display device.

13. The method according to claim 1, wherein said selection type is selected from a group including "a plurality of parameters", "a single parameter" and "a part of a parameter".

14. A computer program product for supporting input of one or more execution parameters of predetermined software in an input field, the computer program product comprising a non-transitory computer readable storage medium having stored thereon computer program code that when executed by at least one processor of a computer makes the computer:
    receive input of a text character string including one or more execution parameters in the input field displayed on a display device;
    determine a selection type in response to a user selection of a part of the text character string;
    display on the display device one or more execution options of the execution parameters depending on the determined selection type, where a user can select one of the one or more execution options in response to a selection of a part of said text character string by the user, said one or more execution options displayed varying according to the type of selection of the part of said text character string; and
    in response to the user selection of a desired execution option, transform said text character string to include the desired execution option selected and display the transformed text character string on the display device,
    wherein said predetermined software is a search engine, said text character string represents a search condition, and said execution options are search options for said search engine and wherein said search options include search field specification, wild card, fuzzy search, proximity search, range search, search term boosting, Boolean operator, grouping and field grouping.

15. A system for supporting input of one or more execution parameters of predetermined software in an input field, comprising:
a computer with a display and a processor configured to perform:
receiving input in the computer of a text character string including one or more execution parameters in the input field;
determining a selection type in response to a user selection of a part of the text character string;
displaying in the display one or more execution options of the execution parameters depending on the determined selection type, where a user can select one of the one or more execution options in response to a selection of a part of said text character string by the user, said one or more execution options displayed varying according to the type of selection of the part of said text character string; and
in response to the user selection of a desired execution option, transforming said text character string to include the desired execution option selected and displaying the transformed text character string,
wherein said predetermined software is a search engine, said text character string represents a search condition, and said execution options are search options for said search engine and
wherein said search options include search field specification, wild card, fuzzy search, proximity search, range search, search term boosting, Boolean operator, grouping and field grouping.

* * * * *